(12) United States Patent
Song et al.

(10) Patent No.: US 11,398,857 B2
(45) Date of Patent: Jul. 26, 2022

(54) USER EQUIPMENT CAPABILITY REPORTING METHOD, SLOT OFFSET DETERMINATION METHOD AND DEVICES

(71) Applicant: VIVO MOBILE COMMUNICATION CO., LTD., Guangdong (CN)

(72) Inventors: Yang Song, Chang'an Dongguan (CN); Peng Sun, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 98 days.

(21) Appl. No.: 16/959,943

(22) PCT Filed: Dec. 27, 2018

(86) PCT No.: PCT/CN2018/124240
§ 371 (c)(1),
(2) Date: Jul. 2, 2020

(87) PCT Pub. No.: WO2019/137226
PCT Pub. Date: Jul. 18, 2019

(65) Prior Publication Data
US 2021/0075486 A1 Mar. 11, 2021

(30) Foreign Application Priority Data
Jan. 12, 2018 (CN) .......................... 201810032716.8

(51) Int. Cl.
| H04W 4/00 | (2018.01) |
| H04B 7/06 | (2006.01) |
| H04W 8/24 | (2009.01) |
| H04W 24/10 | (2009.01) |
| H04W 72/04 | (2009.01) |

(52) U.S. Cl.
CPC ............ *H04B 7/0626* (2013.01); *H04W 8/24* (2013.01); *H04W 24/10* (2013.01); *H04W 72/042* (2013.01); *H04W 72/0446* (2013.01)

(58) Field of Classification Search
None
See application file for complete search history.

(56) References Cited

U.S. PATENT DOCUMENTS

| 2013/0083780 A1 | 4/2013 | Luo et al. |
| 2014/0204848 A1 | 7/2014 | Geirhofer et al. |

(Continued)

FOREIGN PATENT DOCUMENTS

| CN | 101547433 A | 9/2009 |
| CN | 103327634 A | 9/2013 |

(Continued)

OTHER PUBLICATIONS

LG Electronics, Discussion on CSI Timing, 3GPP TSG RAN WG1 NR Ad-Hoc Meeting, R1-1700473, Spokane, USA, Jan. 16-20, 2017.

(Continued)

*Primary Examiner* — Zewdu A Beyen
(74) *Attorney, Agent, or Firm* — Maschoff Brennan

(57) ABSTRACT

A slot offset determination method includes: receiving CSI report request information from a network device; determining a reference slot offset T in accordance with the CSI report request information; and determine a slot offset for a CSI reference resource in accordance with the reference slot offset T.

20 Claims, 4 Drawing Sheets determining a CSI computaton time for a UE to generate a target CSI report — 208 determining a reference slot offset T in accordance with the CSI computation time — 209 transmitting the reference slot offset T to the UE — 210

(56) References Cited

U.S. PATENT DOCUMENTS

| | | | |
|---|---|---|---|
| 2015/0124638 A1 | 5/2015 | Sun et al. | |
| 2016/0164590 A1 | 6/2016 | Noh et al. | |
| 2017/0366998 A1* | 12/2017 | Lee | H04W 24/10 |
| 2018/0102817 A1 | 4/2018 | Park et al. | |
| 2019/0052379 A1* | 2/2019 | Lin | H04L 5/0082 |
| 2019/0165846 A1* | 5/2019 | Kim | H04W 72/0406 |

FOREIGN PATENT DOCUMENTS

| | | |
|---|---|---|
| CN | 103636253 A | 3/2014 |
| CN | 104919718 A | 9/2015 |
| CN | 106455091 A | 2/2017 |
| CN | 107113045 A | 8/2017 |
| CN | 107534540 A | 1/2018 |
| EP | 2903360 | 8/2015 |
| EP | 2 996 418 A1 | 3/2016 |
| WO | 2017/010721 A1 | 1/2017 |
| WO | 2017/168396 A1 | 10/2017 |
| WO | 2019/103562 A1 | 5/2019 |

OTHER PUBLICATIONS

LG Electronics, Discussion on CSI Framework for NR, 3GPP TSG RAN WG1 Meeting #88, R1-1702455, Athens, Greece, Feb. 13-17, 2017.

LG Electronics, WF on CSI Timing Offset for PUSCH, 3GPP TSG RAN WG1 Meeting #91, R1-1721677, Reno, USA, Nov. 27-Dec. 1, 2017.

Extended European Search Report issued in corresponding application No. 18899548.4, dated Jan. 25, 2021.

CN Office Action in Application No. 201810032716.8 dated Mar. 9, 2020.

"Multi-Cell Periodic CSI Reporting" 3GPP TSG RAN WG1 #69, May 21, 2012.

"WF on timings for aperiodic CSI-RS and aperiodic CSI reporting" 3GPP TSG RAN1 NR Ad-Hoc, Jan. 16, 2017.

Ku et al., "Resource Allocation and Link Adaptation in LTE and LTE Advanced: A Tutorial" IEEE, Dec. 18, 2014.

"Status Report to TSG" 3GPP TSG RAN meeting #75, Mar. 6, 2017.

Written Opinion and International Search Report in Application No. PCT/CN2018/124240 dated Jul. 23, 2020.

IN Office Action in Application No. 202027033856 dated Sep. 6, 2021.

KR Office Action in Application No. 10-2020-7020171 dated Jul. 27, 2021.

"Summary of views on CSI reporting" 3GPP TSG-RAN WG1 #91, Ericsson, R1-1721451, Nov. 27, 2017.

"NR CSI Computation Capability" 3GPP TSG-RAN WG1 #91, Ericsson, R1-1720718, Nov. 27, 2017.

"WF on CSI timing offset for PUSCH" 3GPP TSG RAN WG1 Meeting #91, LG Electronics, Ericsson, InterDigital, Samsung, [ZTE, Sanechips], R1-1721527 Nov. 27, 2017.

* cited by examiner transmitting capability information associated with CSI computation to a network device —101
FIG. 1
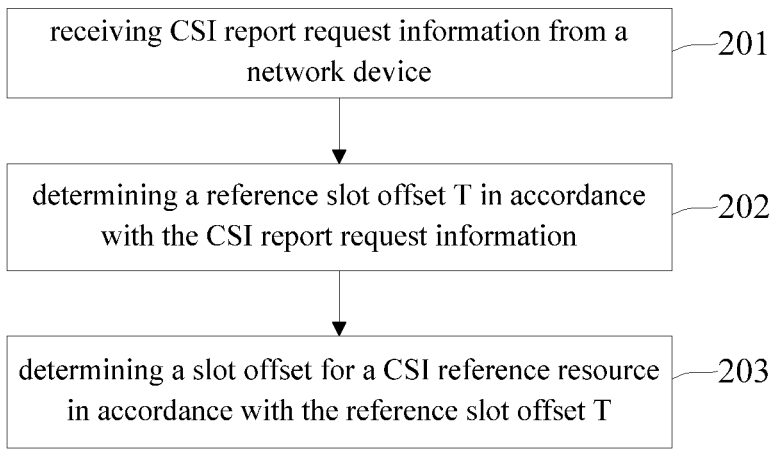
FIG. 2A
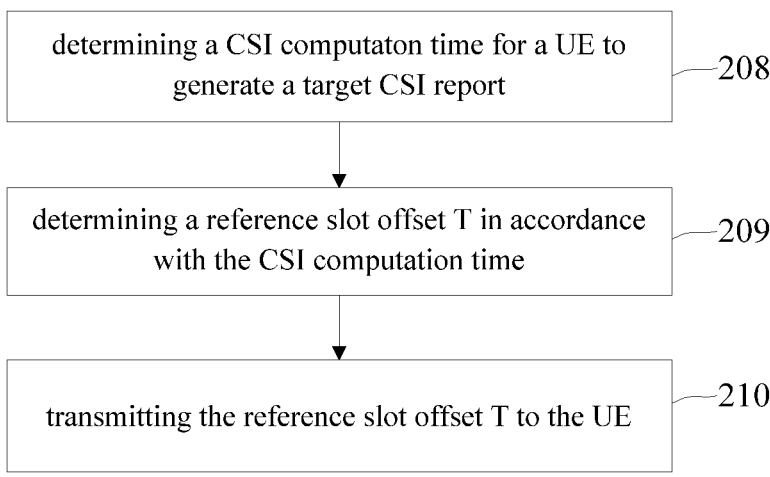
FIG. 2B

US 11,398,857 B2

USER EQUIPMENT CAPABILITY REPORTING METHOD, SLOT OFFSET DETERMINATION METHOD AND DEVICES

CROSS-REFERENCE TO RELATED APPLICATION

The present application is the U.S. national phase of PCT Application No. PCT/CN2018/124240 filed on Dec. 27, 2018, which claims a priority of the Chinese patent application 201810032716.8 filed on Jan. 12, 2018, which are incorporated herein by reference in their entirety.

TECHNICAL FIELD

The present disclosure relates to the field of communication technology, in particular to a User Equipment (UE) capability reporting method, a slot offset determination method and devices.

BACKGROUND

In Technical Specification (TS) 38.214 for a $5^{th}$-Generation (5G) mobile communication system, when one Channel State Information (CSI) resource set is configured for a User Equipment (UE), CSI reference sources for a serving cell in a time domain are defined as downlink slot $n-n_{CQI\_ref}$, where n represents a slot for CSI transmitted by the UE to a network device, and $n_{CQI\_ref}$ represents a slot offset.

Moreover, when the CSI transmitted by the UE is a periodic and semi-persistent CSI report, $n_{CQI\_ref}$ is greater than or equal to a minimum value of T1 and corresponds to a valid downlink slot. When the CSI transmitted by the UE is an aperiodic CSI report, and if the UE is indicated by Downlink Control Information (DCI) to transmit the CSI within a same slot for a CSI request, $n_{CQI\_ref}$ is 0; otherwise, $n_{CQI\_ref}$ is greater than or equal to a minimum value of T2 and corresponds to a valid downlink slot.

For convenience, T1 and T2 may each be called as a reference slot offset T of the CSI reference resource.

The valid downlink slot refers to a slot that meets the following conditions: a condition where the slot is a downlink slot for the UE, a condition where the slot is not located within a measurement gap configured by the UE, and a condition where a Bandwidth Part (BWP) of the slot is consistent with a downlink BWP corresponding to the CSI report.

T1 and T2 fail to be definitely stipulated in TS38.214, so $n_{CQI\_ref}$ is usually determined by a person skilled in the art in accordance values of T1 and T2 in a Long Term Evolution (LTE) system. However, in the LTE system, each of T1 and T2 has a constant value of four slots, and when $n_{CQI\_ref}$ is determined in accordance with this constant value, a value of the determined $n_{CQI\_ref}$ is not flexible sufficiently, and at this time, the CSI reference resources configured by the network device for the UE may not match a capability of the UE itself for calculating the CSI.

SUMMARY

In a first aspect, the present disclosure provides in some embodiments a UE capability reporting method for a UE, including transmitting capability information associated with CSI computation to a network device, the capability information associated with CSI computation including one or more of: CSI reporting types supported by the UE, a value of the maximum number of CSI reports supported by the UE, a CSI computation time for each CSI reporting type supported by the UE corresponding to at least one CSI computation complexity level at different numerologies, and identifier(s) of the list(s) of CSI computation time supported by the UE.

In a second aspect, the present disclosure provides in some embodiments a slot offset determination method for a UE, including: receiving CSI report request information from a network device; determining a reference slot offset T in accordance with the CSI report request information; and determining a slot offset for a CSI reference resource in accordance with the reference slot offset T.

In a third aspect, the present disclosure provides in some embodiments a slot offset determination method for a network device, including: determining a CSI computation time for a UE to generate a target CSI report; determining a reference slot offset T in accordance with the CSI computation time; and transmitting the reference slot offset T to the UE.

In a fourth aspect, the present disclosure provides in some embodiments a slot offset determination method for a network device, including: determining a CSI computation time corresponding to a required aperiodic CSI report for a UE; and determining a slot offset Y for the UE to transmit the aperiodic CSI report in accordance with the CSI computation time corresponding to the required aperiodic CSI report.

In a fifth aspect, the present disclosure provides in some embodiments a UE, including a UE capability reporting module configured to transmit capability information associated with CSI computation to a network device, the capability information associated with CSI computation including one or more of: CSI reporting types supported by the UE, a value of the maximum number of CSI reports supported by the UE, a CSI computation time for each CSI reporting type supported by the UE corresponding to at least one CSI computation complexity level at different numerologies, and identifier(s) of the list(s) of CSI computation time supported by the UE.

In a sixth aspect, the present disclosure provides in some embodiments a UE, including: a first reception module configured to receive CSI report request information from a network device; a first determination module configured to determine a reference slot offset T in accordance with the CSI report request information; and a second determination module configured to determine a slot offset for a CSI reference resource in accordance with the reference slot offset T.

In a seventh aspect, the present disclosure provides in some embodiments a network device, including: a fourth determination module configured to determine a CSI computation time for a UE to generate a target CSI report; a fifth determination module configured to determine a reference slot offset T in accordance with the CSI computation time; and a transmission module configured to transmit the reference slot offset T to the UE.

In an eighth aspect, the present disclosure provides in some embodiments a network device, including: a computation time determination module configured to determine a CSI computation time corresponding to a required aperiodic CSI report for a UE; and a slot offset determination module configured to determine a slot offset Y for the UE to transmit the aperiodic CSI report in accordance with the CSI computation time corresponding to the required aperiodic CSI report.

In a ninth aspect, the present disclosure provides in some embodiments a UE, including a memory, a processor, and a wireless communication program stored in the memory and executed by the processor. The processor is configured to execute the wireless communication program so as to implement the UE capability reporting method in the first aspect or the slot offset determination method in the second aspect.

In a tenth aspect, the present disclosure provides in some embodiments a network device, including a memory, a processor, and a wireless communication program stored in the memory and executed by the processor. The processor is configured to execute the wireless communication program so as to implement the slot offset determination method in the third or fourth aspect.

In an eleventh aspect, the present disclosure provides in some embodiments a computer-readable storage medium storing therein a wireless communication program. The wireless communication program is executed by a processor so as to implement the method in any one of the first to fourth aspects.

BRIEF DESCRIPTION OF THE DRAWINGS

In order to illustrate the technical solutions of the present disclosure or the related art in a clearer manner, the drawings desired for the present disclosure or the related art will be described hereinafter briefly. Obviously, the following drawings merely relate to some embodiments of the present disclosure, and based on these drawings, a person skilled in the art may obtain the other drawings without any creative effort.

FIG. 1 is a flow chart of a UE capability reporting method according to some embodiments of the present disclosure;

FIG. 2A is a flow chart of a slot offset determination method according to some embodiments of the present disclosure;

FIG. 2B is a flow chart of another slot offset determination method according to some embodiments of the present disclosure;

DETAILED DESCRIPTION

Figure 3:
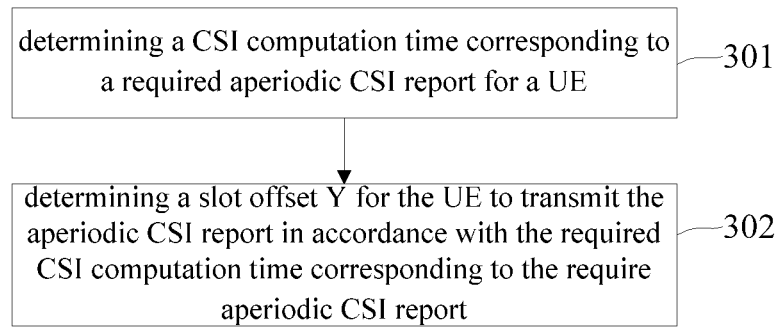
FIG. 3 is a flow chart of yet another slot offset determination method according to some embodiments of the present disclosure.

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

It should be appreciated that, schemes in the embodiments of the present disclosure may be applied to various communication systems, e.g., Global System of Mobile communication (GSM), Code Division Multiple Access (CDMA) system, Wideband Code Division Multiple Access (WCDMA) system, General Packet Radio Service (GPRS) system, Long Term Evolution (LTE) system, Frequency Division Duplexing (FDD) system, Time Division Duplexing (TDD) system, Universal Mobile Telecommunication System (UMTS), Worldwide Interoperability for Microwave Access (WiMAX) communication system, or $5^{th}$-Generation (5G) system (i.e., New Radio (NR) system).

A UE, also called as mobile terminal or mobile terminal device, may communicate with one or more core networks through a Radio Access Network (RAN). The UE may be a mobile terminal, e.g., a mobile phone (or cellular phone), and a computer having a mobile terminal, e.g., a portable, pocket-sized, handheld, built-in or vehicle-mounted mobile device which exchanges voice and/or data with the RAN.

A network device may be a device deployed in the RAN and configured to provide a wireless communication function for the UE. The network device may be a base station, e.g., a Base Transceiver Station (BTS) in the GSM or CMDA system, a Node B in the WCDMA system, an evolved Node B (eNB or e-NodeB) in the LTE system, or a gNB in the 5G system.

The present disclosure will be described hereinafter in more details in conjunction with the embodiments and drawings.

The present disclosure provides in some embodiments a UE capability reporting method which, as shown in FIG. 1, includes Step 101 of transmitting capability information associated with CSI computation to a network device. The capability information associated with CSI computation may include one or more of CSI reporting types supported by the UE, a value of the maximum number of CSI reports supported by the UE, a CSI computation time for each CSI reporting type supported by the UE corresponding to at least one CSI computation complexity level at different numerologies, and identifier(s) of the list(s) of CSI computation time supported by the UE.

More specifically, the CSI reporting types supported by the UE may include a report content type supported by the UE and a codebook type used by the UE. In other words, the CSI reporting types supported by the UE may be divided in accordance with the report content type supported by the UE and the codebook type used by the UE.

For example, depending on report contents, the CSI reporting types may include CRI/RI/PMI/CQI, CRI/RI/i1, CRI/RI/i1/CQI, CRI/RI/CQI, CRI, CRI/RSRP and CRI/RI/SLI/PMI/CQI. In addition, when a CSI report includes a PMI report, depending on the codebook type, the CSI reporting type may include Type-I or Type-II.

CRI represents Channel State Information-Reference Signal (CSI-RS) Resource Indicator, CSI-RS represents Channel State Information-Reference Signal, RI represents Rank Indicator, CQI represents Channel Quality Indicator, PMI indicates Precoding Matrix Indicator, SLI represents Strongest Layer Indicator, RSRP represents Reference Signal Received Power, and i1 represents a first-level codebook indicator.

Of course, the CSI reporting types supported by the UE may also be divided in accordance with the CSI computation complexity level as well as the numerology, which will not be particularly defined herein.

The numerology may be determined in accordance with BWP information carried in CSI report request information, especially a SubCarrier Spacing (SCS) and a Cyclic Prefix (CP) carried on the CSI report request information. The SCS may be, e.g., 15 KHz, 30 KHz, 60 KHz or 120 KHz.

For a periodic CSI report, the CSI report request information may be configured through Radio Resource Control (RRC) signaling ReportConfig. A semi-persistent CSI report may be activated through downlink Control Information (DCI), and an aperiodic CSI report may be triggered through DCI. The UE may acquire information about the CSI report required for the network device, including periodicity, CSI reporting type and codebook type, from the CSI report request information.

It should be appreciated that, when the UE supports the generation of a plurality of CSI reports simultaneously (the plurality of CSI reports may be CSI reports of a plurality of types or CSI reports corresponding to a plurality of CSI computation complexity levels or at a plurality of numerologies, or CSI reports of a same CSI reporting type), the computation time corresponding to at least one CSI computation complexity level of each CSI reporting type supported by the UE at different numerologies may be a CSI computation time corresponding to at least one CSI computation complexity level of a plurality of CSI reports at different numerologies.

The CSI computation time may be understood as the number of Orthogonal Frequency Division Multiplexing (OFDM) symbols for the CSI report acquired through calculation. A value of the CSI computation time may reflect the CSI computation complexity level. Generally speaking, the larger the value of the CSI computation time, the higher the CSI computation complexity level, and vice versa.

The identifiers of the CSI computation time lists supported by the UE may be identifiers of the CSI computation time lists set by a manufacturer when the UE leaves the factory. It should be appreciated that, a plurality of CSI computation time lists like those in Table 1 may be defined in a standard or protocol, so as to be adapted to different UE capabilities, accordingly the manufacturer may configure the identifiers of the CSI computation time lists supported by the UE to the UE in accordance with the UE capability. Further, upon the receipt of an identifier of a CSI computation time list supported by the UE, the network device may determine one CSI computation time list from the plurality of CSI computation time lists in the standard or protocol in accordance with the identifier, so as to determine the CSI computation time for the UE to generate the corresponding CSI report.

In a possible embodiment of the present disclosure, the capability information associated with CSI computation may further include one or more of: information indicating that the UE supports a capability of updating CSI belonging to a plurality of Component Carriers (CCs) simultaneously as well as a CSI computation time corresponding to each CSI computation complexity level at a corresponding numerology; and information indicating that the UE supports a capability of updating CSI report group information having different CSI reporting types or at different CSI computation complexity levels or different numerologies simultaneously as well as corresponding CSI computation time.

The information indicating that the UE supports a capability of updating the CSI belonging to the plurality of CCs simultaneously may include a maximum number of the CCs capable of being updated simultaneously, and information about the CCs capable of being updated simultaneously.

The information indicating that the UE supports a capability of updating the information about the CSI report groups having different CSI reporting types or at different CSI computation complexity levels simultaneously may include various possible CSI groups having different CSI reporting types and capable of being updated by the UE simultaneously, the number of the CCs in each CSI group capable of being supported by the UE, and a maximum number of the CCs capable of being supported by the UE. For example, the information about one CSI group may include CSI of the codebook type Type-II on a first CC and CSI of the codebook type Type-I on several other CCs which are capable of being updated simultaneously, and the number of CCs in the CSI group capable of being supported by the UE. For another example, the CSI group capable of being updated by the UE may include one piece of CSI of the codebook type Type-II and several pieces of CSI of the codebook type Type-I, or two pieces of CSI of the codebook type Type-II and several pieces of CSI of the codebook type Type-I.

The CSI of different types may have different calculation complexity levels, and different UEs may have different processing capabilities. Hence, even when the CSI of a same type is calculated by different UEs, the computation time may not necessarily be the same, i.e., the CSI computation capabilities of the UEs may probably be different from each other.

In the related art, the CSI computation capabilities of the UEs are not taken into consideration by the network device. However, in the embodiments of the present disclosure, at a given numerology and a given CSI computation complexity level, when merely the CSI (not including any data) is transmitted on a Physical Uplink Shared Channel (PUSCH) (taking the triggering of an aperiodic CSI report as an example), the CSI computation time Z may be determined mainly in accordance with a minimum number of OFDM symbols required for receiving the DCI including a CSI report triggering indication, and performing Physical Downlink Control Channel (PDCCH) detection and decoding, channel estimation and CSI computation. The above factors may reflect the capability information associated with CSI computation of the UE, so the UE may transmit the CSI report to the network device at a more appropriate time.

According to the UE capability reporting method in the embodiments of the present disclosure, the UE may transmit capability information associated with the CSI computation to the network device, so that the network device may request the CSI report from the UE in accordance with an actual capability of the UE, so as to improve the flexibility of the configuration of a CSI request by the network device for the UE, and enable the CSI computation time of the UE to match the computation capability of the UE itself. As a result, it is able for the UE to transmit the CSI report to the network device at a more appropriate time, and prevent the occurrence of a waste of time-domain resources and the occurrence of a failure of transmitting an updated CSI report to the network device due to an insufficient computation time, thereby to improve the feedback efficiency of the CSI report for the UE.

The present disclosure further provides in some embodiments a slot offset determination method for a UE which, as shown in FIG. 2A, includes the following steps.

Step 201: receiving CSI report request information from a network device.

Generally, the CSI report request information from the network device may include such information as the number of CSI reports, a type of each CSI report, codebook types required to be used by the UE, and a bandwidth for each CSI report. The UE may determine a CSI computation time in accordance with the information.

Step 202: determining a reference slot offset T in accordance with the CSI report request information.

In a possible embodiment of the present disclosure, prior to Step 202, the slot offset determination method may further include receiving a plurality of reference slot offsets T configured by the network device in advance. Step 202 may specifically include: determining a target CSI report to be transmitted in accordance with the CSI report request information; and determining the reference slot offset T matching the target CSI report from the plurality of reference slot offsets T configured by the network device in advance.

In another possible embodiment of the present disclosure, Step 202 may specifically include: determining a CSI computation time for each CSI report in accordance with the CSI report request information; and determining the reference slot offset T in accordance with the CSI computation time.

The determining the CSI computation time for each CSI report in accordance with the CSI report request information may include: determining a numerology and a CSI computation complexity level corresponding to each CSI report in accordance with the CSI report request information; and determining the CSI computation time for the CSI report at the numerology and the CSI computation complexity level.

More specifically, the CSI computation time Z for the CSI at the numerology and the CSI computation complexity level may be determined in any one of the following three modes.

In a first mode, the CSI computation time Z for the CSI at the numerology and the CSI computation complexity level may be determined in accordance with capability information associated with CSI computation of the UE. Description about the capability information associated with CSI computation of the UE may refer to that mentioned hereinabove as described in FIG. 1, and thus will not be particularly defined herein.

In a second mode, the CSI computation time Z for the CSI at the numerology and the CSI computation complexity level configured by the network device in advance through signaling may be received. To be specific, the CSI computation time Z for the CSI at the numerology and the CSI computation complexity level may be configured by the network device through DCI signaling.

In a third mode, the CSI computation time Z for the CSI at the numerology and the CSI computation complexity level may be determined in accordance with a preset CSI computation time list.

The preset CSI computation time list may be a list for determining the CSI computation time in accordance with a conventional protocol, e.g., TS38.214, as shown in Table 1.

TABLE 1

| CSI computation complexity level | 15 KHz SCS | 30 KHz SCS | 60 KHz SCS | 120 KHz SCS |
|---|---|---|---|---|
| Low complexity level 1 | $Z_{1,1}$ | $Z_{1,2}$ | $Z_{1,3}$ | $Z_{1,4}$ |
| High complexity level 1 | $Z_{2,1}$ | $Z_{2,2}$ | $Z_{2,3}$ | $Z_{2,4}$ |
| High complexity level . . . | . . . | . . . | . . . | . . . |
| High complexity level n | $Z_{n+1,1}$ | $Z_{n+1,2}$ | $Z_{n+1,3}$ | $Z_{n+1,4}$ |

Table 1 shows the CSI computation time Z corresponding to different CSI computation complexity levels and different SCSs, and the unit of Z may be OFDM symbols. In Table 1, a specific applicable scenario for the CSI computation time Z corresponding to the low complexity level 1 at any SCS has not been specified, e.g., the applicable scenario may be a scenario for CSI-RSs with at most two ports and a codebook type Type-I, or a scenario for CSI-RSs with at most eight ports and without any PMI feedback. A specific applicable scenario for the CSI computation time Z corresponding to any high complexity level at any SCS has not been specified yet.

The CSI computation time Z at different CSI computation complexity levels and different SCSs in Table 1 may be a minimum requirement to be met by the UEs, i.e., a standard that needs to be met by all the UEs. Of course, in the case that the computation capability of the UE itself is relatively strong, the CSI computation time Z at each CSI computation complexity level and each SCS may be smaller than a corresponding value in Table 1. Alternatively, a plurality of lists may be specified in the protocol, and different values of Z may correspond to the UEs having different calculation capabilities respectively.

To be specific, a ratio of the CSI computation time to the number of OFDM symbols within one slot may be calculated and rounded up to acquire an integer, and then the integer may be determined as the reference slot offset T.

In other words, the reference slot offset T may be determined through a formula $T=\lceil Z/N_{symb}^{slot} \rceil$ (1), where Z represents the CSI computation time determined in Step 202, $N_{symb}^{slot}$ represents the number of OFDM symbols within one slot, and $\lceil \ \rceil$ represents a round-up operation.

It should be appreciated that, when the CSI report determined in accordance with the CSI report request information is a periodic or semi-persistent CSI report, in Step 203, the reference slot offset T determined in accordance with the CSI computation time may be a first reference slot offset T1. When the CSI report determined in accordance with the CSI report request information is an aperiodic CSI report and the slot within which the CSI report is indicated by the network device in DCI is different from a slot within which the DCI including the CSI report request information is located, in Step 203, the reference slot offset T determined in accordance with the CSI computation time may be a second reference slot offset T2.

The meanings of T1 and T2 may refer to those mentioned in the background, and thus will not be particularly defined herein.

It should be appreciated that, in the embodiments of the present disclosure, T1 may be the same as, or different from, T2. Of course, T1 and T2 may be configured by the network device through RRC signaling ReportConfig. It should be further appreciated that, a plurality of T1 or T2 may be configured by the network device with respect to the required CSI reports of different types.

Step 203: determining a slot offset for a CSI reference resource in accordance with the reference slot offset T.

The slot offset for the CSI reference resource may be just $n_{CQI\_ref}$ mentioned in the background. For ease of understanding, the slot offset $n_{CQI\_ref}$ of the CSI reference resource will be described hereinafter again.

When the CSI report to be transmitted by the UE is a periodic and semi-persistent CSI report, $n_{CQI\_ref}$ may be the smallest value greater than or equal to T1, such that slot n-$n_{CQI\_ref}$ corresponds to a valid downlink slot. In other words, when the CSI report to be transmitted by the UE is a periodic and semi-persistent CSI report, a valid downlink slot closest to T1 may be selected from slots greater than or equal to T1 as the slot offset $n_{CQI\_ref}$ of the CSI reference resource, and then an $(n_{CQI\_ref})^{th}$ slot before a slot n for the CSI report may serve as the CSI reference resource.

When the CSI report transmitted by the UE is an aperiodic CSI report, and if the UE is indicated by the DCI to report CSI in the same slot as the CSI request, $n_{CQI\_ref}$ may be 0; otherwise, $n_{CQI\_ref}$ may be the smallest value greater than or equal to T2, such that slot n-$n_{CQI\_ref}$ corresponds to a valid downlink slot. In other words, a valid downlink slot closest to T2 may be selected from slots greater than or equal to T2 as the slot offset $n_{CQI\_ref}$ of the CSI reference resource, and then an $(n_{CQI\_ref})^{th}$ slot before a slot n for the CSI report may serve as the CSI reference resource.

The valid downlink slot may refer to a slot meeting the following conditions: a condition where the slot is a downlink slot for the UE, a condition where the slot is not within a measurement gap configured for the UE, and a condition where a BWP of the slot is consistent with a downlink BWP corresponding to the CSI report.

According to the slot offset determination method in the embodiments of the present disclosure, the value of the reference slot offset T (T1 or T2) may be determined in accordance with the CSI report request information, so as to flexibly determine the slot offset $n_{CQI\_ref}$ of the CSI reference resource without reference to the constant values of T1 and T2 in the LTE system when T1 and T2 fail to be definitely stipulated in TS38.214, thereby to enable the CSI reference source to match the CSI computation capability of the UE itself.

In addition, it should be appreciated that, in Step 202, when the CSI computation time for the CSI report at the numerology and the CSI computation complexity level is determined in accordance with the capability information associated with CSI computation of the UE, the determined slot offset $n_{CQI\_ref}$ of the CSI reference resource may match the CSI computation capability of the UE itself in a better manner. As a result, it is able for the UE to transmit the CSI report to the network device at a more appropriate time, and prevent the occurrence of a waste of time-domain resources and the occurrence of a failure of transmitting an updated CSI report to the network device due to an insufficient computation time, thereby to improve the feedback efficiency of the CSI report for the UE.

In a possible embodiment of the present disclosure, when the CSI report request information indicates that there is a plurality of CSI reports and there is a plurality of reference slot offsets T determined in accordance with the CSI computation time for the plurality of CSI reports, Step 203 may include determining the slot offset for the CSI reference resource in accordance with a maximum value of the plurality of determined reference slot offsets T.

In a possible embodiment of the present disclosure, Step 203 may include determining slot offsets of at least two CSI reference resources in accordance with different reference slot offsets T in the plurality of determined reference slot offsets T. For example, if the UE is indicated by the network device to transmit five CSI reports on one PUSCH and the UE has determined the reference slot offset corresponding to each CSI report (the reference slot offsets corresponding to two CSI reports are the same, and the reference slot offsets corresponding to the other three CSI reports are the same), the slot offset for one CSI reference resource may be determined in accordance with a maximum value of the two determined reference slot offsets, or the slot offsets of two CSI reference resources may be determined in accordance with the two determined reference slot offsets.

It should be appreciated that, the slot offsets of the plurality of CSI reference sources may be determined with respect to the CSI reports of different types, so as to further determine the slot offset $n_{CQI\_ref}$ of the CSI reference resource flexibly.

In a possible embodiment of the present disclosure, the slot offset determination method may further include transmitting capability information associated with CSI computation to the network device. The capability information associated with CSI computation may include one or more of CSI reporting types supported by the UE, a value of the maximum number of CSI reports supported by the UE, a CSI computation time for each CSI reporting type supported by the UE corresponding to at least one CSI computation complexity level at different numerologies, and identifier(s) of the list(s) of CSI computation time supported by the UE.

In a possible embodiment of the present disclosure, the capability information associated with CSI computation may further include one or more of: information indicating that the UE supports a capability of updating CSI belonging to a plurality of CCs simultaneously as well as a CSI computation time corresponding to each CSI computation complexity level at a corresponding numerology; and information indicating that the UE supports a capability of updating CSI report group information having different CSI reporting types or at different CSI computation complexity levels or different numerologies simultaneously as well as corresponding CSI computation time.

It should be appreciated that, the UE may transmit the capability information associated with CSI computation to the network device, so that the network device may request the CSI report from the UE in accordance with an actual capability of the UE, so as to improve the flexibility of the configuration of a CSI request by the network device for the UE, and enable the CSI computation time of the UE to match the computation capability of the UE itself. As a result, it is able for the UE to transmit the CSI report to the network device at a more appropriate time, and prevent the occurrence of a waste of time-domain resources and the occurrence of a failure of transmitting an updated CSI report to the network device due to an insufficient computation time, thereby to improve the feedback efficiency of the CSI report for the UE.

The present disclosure further provides in some embodiments a slot offset determination method for a network device which, as shown in FIG. 2B, includes the following steps.

Step 208: determining a CSI computation time for a UE to generate a target CSI report.

In a possible embodiment of the present disclosure, Step 208 may include receiving the CSI computation time for the UE to generate the target CSI report from the UE.

In another possible embodiment of the present disclosure, Step 208 may further include: receiving an identifier of a CSI computation time list supported by the UE from the UE; determining a target CSI computation time list matching the identifier from a preset sets of CSI computation time lists in accordance with the identifier; and looking up the CSI computation time matching the target CSI report from the target CSI computation time list.

Step 209: determining a reference slot offset T in accordance with the CSI computation time.

To be specific, Step 209 may include: calculating a ratio of the CSI computation time to the number of OFDM symbols within one slot; rounding up the ratio to acquire an integer; and determining the integer as the reference slot offset T.

To be specific, the reference slot offset T may be determined through a formula $T = \lceil Z/N_{symb}^{slot} \rceil$ (2), where Z represents the CSI computation time determined in Step 202, $N_{symb}^{slot}$ represents the number of OFDM symbols within one slot, and $\lceil \ \rceil$ represents a round-up operation.

Step 210: transmitting the reference slot offset T to the UE.

After the transmission of the reference slot offset T to the UE, the UE may determine a slot offset for a CSI reference resource in accordance with the received reference slot offset T.

According to the slot offset determination method in the embodiments of the present disclosure, the value of the reference slot offset T (T1 or T2) may be determined in accordance with the CSI report request information, so as to flexibly determine the slot offset $n_{CQI\_ref}$ of the CSI reference resource without reference to the constant values of T1 and T2 in the LTE system when T1 and T2 fail to be definitely stipulated in TS38.214, thereby to enable the CSI reference source to match the CSI computation capability of the UE itself.

The present disclosure further provides in some embodiments a slot offset determination method for a network device which, as shown in FIG. 3, includes the following steps.

Step 301: determining a CSI computation time corresponding to a required aperiodic CSI report for a UE.

To be specific, in Step 301, the CSI computation time corresponding to the aperiodic CSI report may be determined in any one of the following two modes. In a first mode, the network device may determine the CSI computation time in accordance with a preset CSI computation time list. And in a second mode, the network device may determine the CSI computation time in accordance with capability information associated with CSI computation transmitted by the UE. Of course, the network device may also determine the CSI computation time corresponding to the aperiodic CSI report in any other modes, which will not be particularly defined herein.

The preset CSI computation time list may be a list for determining the CSI computation time in accordance with a conventional protocol, e.g., TS38.214, as shown in the above Table 1.

The capability information associated with CSI computation transmitted by the UE may refer to that mentioned in FIG. 1 and FIG. 2A, and thus will not be particularly defined herein.

It should be appreciated that, usually, the CSI report required for the network device may be a CSI reporting type capable of being supported by the UE.

Step 302: determining a slot offset Y for the UE to transmit the aperiodic CSI report in accordance with the CSI computation time corresponding to the required aperiodic CSI report.

It should be appreciated that, usually, the slot offset Y for the UE to transmit the aperiodic CSI report is a time interval between a slot within which the CSI report request information has been received from the UE and a slot within which the UE is required by the network device to transmit the aperiodic CSI report.

To be specific, in the case that a CSI-RS associated with the aperiodic CSI report is an aperiodic CSI-RC, Step 302 may include: determining, by the network device, a time offset X for the transmission of the aperiodic CSI-RS associated with the aperiodic CSI report, the time offset X being a time interval between a slot within which DCI for triggering the transmission of the aperiodic CSI report request information is located and a slot within which the aperiodic CSI-RS is transmitted; and determining the slot offset Y for the UE to transmit the aperiodic CSI in accordance with the CSI computation time corresponding to the required CSI report and the required time offset X.

More specifically, the determining the slot offset Y for the UE to transmit the aperiodic CSI in accordance with the CSI computation time corresponding to the required CSI report and the required time offset X may include: determining a ratio of the CSI computation time corresponding to the required CSI report to the number of OFDM symbols within one slot; rounding up the ratio to acquire an integer; and determining the slot offset Y for the UE to transmit the aperiodic CSI in accordance with the integer, the time offset X and a time advance N.

It should be appreciated that, when the CSI report request information received by the UE indicates the UE to transmit the CSI report to the network device after number Y of slots, the UE needs to calculate the CSI within a time period shorter than the slot offset Y, and when the UE fails to calculate the CSI, it is impossible for the UE to transmit the updated CSI to the network device.

Hence, in a possible embodiment of the present disclosure, the slot offset Y may be calculated through a formula $\geq X + \lceil Z/N_{symb}^{slot} + N \rceil$ (3), where X represents the time offset X, Z represents the CSI computation time in Step 301, $N_{symb}^{slot}$ represents the number of OFDM symbols within one slot, $\lceil \ \rceil$ represents a round-up operation, and N represents a time advance TA and has a unit of OFDM symbol, e.g., TA=1.4 OFDM symbols.

The slot offset for the CSI reference resource mentioned hereinabove is also calculated in accordance with a ratio $Z/N_{symb}^{slot}$, so in a possible embodiment of the present disclosure, the slot offset Y may also be calculated through a formula $Y \geq X + T + N$ (4).

In the related art, when the aperiodic CSI report is triggered to be merely transmitted on a Physical Uplink Shared Channel (PUSCH) within a slot n, in some cases, the UE may not update (re-calculate) the CSI in the aperiodic CSI report. For example, at a given CSI computation complexity level and a given numerology, when M−L−N<Z, the UE may not update (re-calculate) the CSI in the aperiodic CSI report. Alternatively, at the given CSI computation complexity level and the given numerology, when M−O−N<Z, the UE may not update (re-calculate) the CSI in the aperiodic CSI report. L represents a last OFDM symbol for a PDCCH within a slot n, M represents a first OFDM symbol for an uplink shared channel, N represents a TA and has a unit of OFDM symbol, and O represents a later OFDM symbol between a last OFDM symbol for an aperiodic CSI-RS for channel measurement and a last OFDM symbol for an aperiodic CSI-RS for interference measurement.

Corresponding to the procedures executed by the network device, the UE may receive the CSI report request information transmitted by the network device through DCI, and determine the slot offset Y for the UE to transmit the CSI report. In addition, when the UE fails to find the CSI reference resource in accordance with the slot offset Y for the received CSI report request information and there is no enough time for the UE to calculate new CSI, the UE may not transmit the CSI report, or transmit a historical CSI report to the network device.

According to the slot offset determination method for the network device in the embodiments of the present disclosure, the slot offset Y for the UE to transmit the aperiodic CSI report may be determined in accordance with the CSI computation time corresponding to the required aperiodic CSI report for the UE, so the network device may determine the slot offset Y for the UE to transmit the aperiodic CSI report in a more appropriate manner. As a result, the UE may transmit the updated CSI to the network device successfully upon the receipt of the CSI report request information, and the CSI acquired by the network device may reflect an actual channel state in a better manner.

In a possible embodiment of the present disclosure, when the CSI computation time corresponding to the aperiodic CSI report is determined by the network device in accordance with capability information associated with CSI computation transmitted by the UE in Step 301, prior to Step 301, the slot offset determination method may further include receiving the capability information associated with CSI computation transmitted by the UE.

The capability information associated with CSI computation may include one or more of CSI reporting types supported by the UE, a value of the maximum number of CSI reports supported by the UE, a CSI computation time for each CSI reporting type supported by the UE corresponding to at least one CSI computation complexity level at different numerologies, and identifier(s) of the list(s) of CSI computation time supported by the UE.

In a possible embodiment of the present disclosure, the capability information associated with CSI computation may further include one or more of: information indicating that the UE supports a capability of updating CSI belonging to a plurality of CCs simultaneously as well as a CSI computation time corresponding to each CSI computation complexity level at a corresponding numerology; and information indicating that the UE supports a capability of updating CSI report group information having different CSI reporting types or at different CSI computation complexity levels or different numerologies simultaneously as well as corresponding CSI computation time.

Based on the above, in a possible embodiment of the present disclosure, the slot offset determination method may further include configuring the CSI computation time determined in accordance with the capability information associated with CSI computation transmitted by the UE for the UE.

It should be appreciated that, when the CSI computation time for each CSI report at the numerology and the CSI computation complexity level is determined in accordance with the capability information associated with CSI computation of the UE, the determined slot offset Y for the UE to transmit the CSI report may match the CSI computation capability of the UE itself in a better manner. As a result, it is able for the UE to transmit the CSI report to the network device at a more appropriate time, and prevent the occurrence of a waste of time-domain resources and the occurrence of a failure of transmitting an updated CSI report to the network device due to an insufficient computation time, thereby to improve the feedback efficiency of the CSI report for the UE.

The methods have been described hereinabove in detail in conjunction with FIG. 1 to FIG. 3, and a corresponding device will be described hereinafter in conjunction with FIG. 4.

Figure 4:
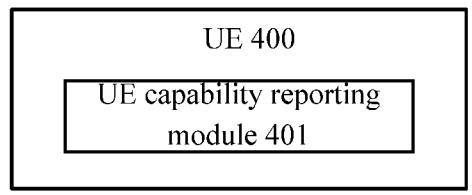
FIG. 4 is a schematic view showing a UE according to some embodiments of the present disclosure.

The present disclosure further provides in some embodiments a UE 400 which, as shown in FIG. 4, includes a UE capability reporting module 401 configured to transmit capability information associated with CSI computation to a network device. The capability information associated with CSI computation may include one or more of CSI reporting types supported by the UE, a value of the maximum number of CSI reports supported by the UE, a CSI computation time for each CSI reporting type supported by the UE corresponding to at least one CSI computation complexity level at different numerologies, and identifier(s) of the list(s) of CSI computation time supported by the UE.

In a possible embodiment of the present disclosure, the capability information associated with CSI computation may further include one or more of: information indicating that the UE supports a capability of updating CSI belonging to a plurality of CCs simultaneously as well as a CSI computation time corresponding to each CSI computation complexity level at a corresponding numerology; and information indicating that the UE supports a capability of updating CSI report group information having different CSI reporting types or at different CSI computation complexity levels or different numerologies simultaneously as well as corresponding CSI computation time.

According to the UE 400 in the embodiments of the present disclosure, the UE may transmit the capability information associated with CSI computation to the network device, so that the network device may request the CSI report from the UE in accordance with an actual capability of the UE, so as to improve the flexibility of the configuration of a CSI request by the network device for the UE, and enable the CSI computation time of the UE to match the computation capability of the UE itself. As a result, it is able for the UE to transmit the CSI report to the network device at a more appropriate time, and prevent the occurrence of a waste of time-domain resources and the occurrence of a failure of transmitting an updated CSI report to the network device due to an insufficient computation time, thereby to improve the feedback efficiency of the CSI report for the UE.

The implementation of the UE 400 may refer to that of the method in FIG. 1, and units/modules of the UE as well as the above-mentioned other operations and/or functions may be used to implement corresponding procedures in the method as shown in FIG. 1, which will not be particularly defined herein for conciseness.

Figure 5A:
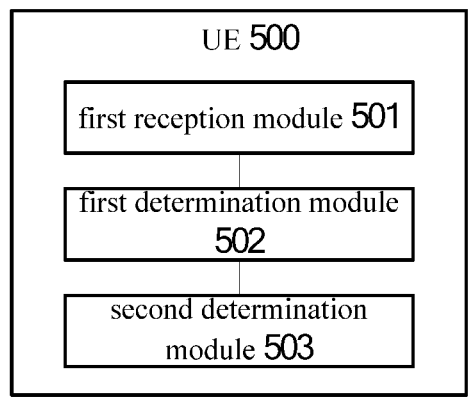
FIG. 5A is another schematic view showing the UE according to some embodiments of the present disclosure.

The present disclosure further provides in some embodiments a UE 500 which, as shown in FIG. 5A, includes: a first reception module 501 configured to receive CSI report request information from a network device; a first determination module 502 configured to determine a reference slot offset T in accordance with the CSI report request information; and a second determination module 503 configured to determine a slot offset for a CSI reference resource in accordance with the reference slot offset T.

Generally, the CSI report request information from the network device may include such information as the number of CSI reports, types of the CSI reports, codebook types required to be used by the UE, and a bandwidth of each CSI report. The UE may determine a CSI computation time in accordance with the information.

In a possible embodiment of the present disclosure, the UE 500 may further include a second reception module configured to, prior to determining the reference slot offset T in accordance with the CSI report request information, receive a plurality of reference slot offsets T configured by the network device in advance. The first determination module 502 is further configured to: determine a target CSI report to be transmitted in accordance with the CSI report request information; and determine the reference slot offset T matching the target CSI report from the plurality of reference slot offsets T configured by the network device in advance.

In another possible embodiment of the present disclosure, the first determination module 502 is further configured to: determine the CSI computation time for the CSI report in accordance with the CSI report request information; and determine the reference slot offset T in accordance with the CSI computation time.

To be specific, the first determination module 502 may further include: a first sub-module configured to determine a numerology and a CSI computation complexity level corresponding to the CSI report in accordance with the CSI report request information; and a second sub-module configured to determine the CSI computation time for the CSI report at the numerology and the CSI computation complexity level.

The second sub-module is further configured to determine the CSI computation time for the CSI report at the numerology and the CSI computation complexity level in one of the following modes.

In a first mode, the second sub-module may determine the CSI computation time for the CSI report at the numerology and the CSI computation complexity level in accordance with capability information associated with CSI computation of the UE.

In a second mode, the second sub-module may receive the CSI computation time for the CSI report at the numerology and the CSI computation complexity level configured by the network device in advance through signaling.

In a third mode, the second sub-module may determine the CSI computation time for the CSI report at the numerology and the CSI computation complexity level in accordance with a preset CSI computation time list.

The preset CSI computation time list may be a list for determining the CSI computation time in accordance with a conventional protocol, e.g., TS38.214.

In a possible embodiment of the present disclosure, the first determination module 502 is further configured to determine the reference slot offset T in accordance with the CSI computation time.

To be specific, the first determination module 502 is further configured to: calculate a ratio of the CSI computation time to the number of OFDM symbols within one slot; round up the ratio to acquire an integer; and determine the integer as the reference slot offset T.

In other words, the reference slot offset T may be determined through a formula $T=\lceil Z/N_{symb}^{slot} \rceil$ (5), where Z represents the CSI computation time determined in Step 202, $N_{symb}^{slot}$ represents the number of OFDM symbols within one slot, and $\lceil \; \rceil$ represents a round-up operation.

According to the UE in the embodiments of the present disclosure, the value of the reference slot offset T (T1 or T2) may be determined in accordance with the CSI report request information, so as to flexibly determine the slot offset $n_{CQI\_ref}$ of the CSI reference resource without reference to the constant values of T1 and T2 in the LTE system when T1 and T2 fail to be definitely stipulated in TS38.214, thereby to enable the CSI reference source to match the CSI computation capability of the UE itself.

In addition, it should be appreciated that, when the first determination module 502 determines the CSI computation time for the CSI report at the numerology and the CSI computation complexity level in accordance with the capability information associated with CSI computation of the UE, the determined slot offset $n_{CQI\_ref}$ of the CSI reference resource may match the CSI computation capability of the UE itself in a better manner. As a result, it is able for the UE to transmit the CSI report to the network device at a more appropriate time, and prevent the occurrence of a waste of time-domain resources and the occurrence of a failure of transmitting an updated CSI report to the network device due to an insufficient computation time, thereby to improve the feedback efficiency of the CSI report for the UE.

In a possible embodiment of the present disclosure, the second determination module 503 is further configured to, when the CSI report request information indicates that there is a plurality of CSI reports and there is a plurality of reference slot offsets T determined in accordance with the CSI computation time for the plurality of CSI reports, determine the slot offset for the CSI reference resource in accordance with a maximum value of the plurality of determined reference slot offsets T.

In another possible embodiment of the present disclosure, the second determination module 503 is further configured to, when the CSI report request information indicates that there is a plurality of CSI reports and there is a plurality of reference slot offsets T determined in accordance with the CSI computation time for the plurality of CSI reports, determine slot offsets of at least two CSI reference resources in accordance with different reference slot offsets T in the plurality of determined reference slot offsets T.

It should be appreciated that, the slot offsets of the plurality of CSI reference sources may be determined with respect to the CSI reports of different types, so as to further determine the slot offset $n_{CQI\_ref}$ of the CSI reference resource flexibly.

In a possible embodiment of the present disclosure, the UE 500 may further include a UE capability reporting module configured to, when the CSI computation time for the CSI report at the numerology and the CSI computation complexity level is determined in accordance with capability information associated with CSI computation of the UE and prior to the determination of the CSI computation time for the CSI report in accordance with the CSI report request information, transmit the capability information associated with CSI computation to the network device. The capability information associated with CSI computation may include one or more of CSI reporting types supported by the UE, a value of the maximum number of CSI reports supported by the UE, the CSI computation time of each CSI reporting type supported by the UE corresponding to at least one CSI computation complexity level at different numerologies, and identifier(s) of the list(s) of CSI computation time supported by the UE.

In a possible embodiment of the present disclosure, the capability information associated with CSI computation may further include one or more of: information indicating that the UE supports a capability of updating CSI belonging to a plurality of CCs simultaneously as well as a CSI computation time corresponding to each CSI computation complexity level at a corresponding numerology; and information indicating that the UE supports a capability of updating CSI report group information having different CSI reporting types or at different CSI computation complexity levels or different numerologies simultaneously as well as corresponding CSI computation time.

It should be appreciated that, the UE 500 may transmit the capability information associated with CSI computation to the network device, so that the network device may request the CSI report from the UE in accordance with an actual capability of the UE, so as to improve the flexibility of the configuration of a CSI request by the network device for the UE, and enable the CSI computation time of the UE to match the computation capability of the UE itself. As a result, it is able for the UE to transmit the CSI report to the network device at a more appropriate time, and prevent the occurrence of a waste of time-domain resources and the occurrence of a failure of transmitting an updated CSI report to the network device due to an insufficient computation time, thereby to improve the feedback efficiency of the CSI report for the UE.

The implementation of the UE 500 may refer to that of the method in FIG. 2A, and units/modules of the UE as well as the above-mentioned other operations and/or functions may be used to implement corresponding procedures in the method as shown in FIG. 2A, which will not be particularly defined herein for conciseness.

Figure 5B:
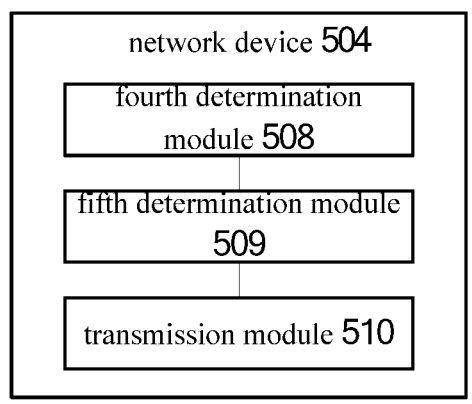
FIG. 5B is yet another schematic view showing the network device according to some embodiments of the present disclosure.

The present disclosure further provides in some embodiments a network device 504 which, as shown in FIG. 5B, includes: a fourth determination module 508 configured to determine a CSI computation time for a UE to generate a target CSI report; a fifth determination module 509 configured to determine a reference slot offset T in accordance with the CSI computation time; and a transmission module 510 configured to transmit the reference slot offset T to the UE.

According to the network device 504 in the embodiments of the present disclosure, the value of the reference slot offset T (T1 or T2) may be determined in accordance with the CSI report request information, so as to flexibly determine the slot offset $n_{CQI\_ref}$ of the CSI reference resource without reference to the constant values of T1 and T2 in the LTE system when T1 and T2 fail to be definitely stipulated in TS38.214, thereby to enable the CSI reference source to match the CSI computation capability of the UE itself.

Figure 6:
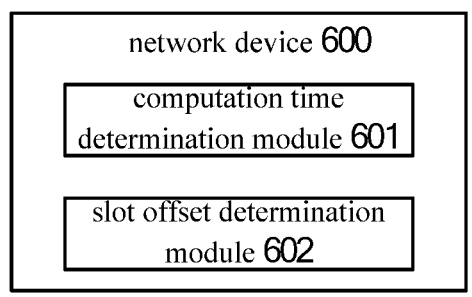
FIG. 6 is a schematic view showing a network device according to some embodiments of the present disclosure.

The present disclosure further provides in some embodiments a network device 600 which, as shown in FIG. 6, includes: a computation time determination module 601 configured to determine a CSI computation time corresponding to a required aperiodic CSI report for a UE; and a slot offset determination module 602 configured to determine a slot offset Y for the UE to transmit the aperiodic CSI report in accordance with the CSI computation time corresponding to the required aperiodic CSI report.

To be specific, the computation time determination module 601 may determine the CSI computation time corresponding to the aperiodic CSI report in any one of the following two modes. In a first mode, the computation time determination module 601 may determine the CSI computation time corresponding to the aperiodic CSI report in accordance with a preset CSI computation time list. In a second mode, the computation time determination module 601 may determine the CSI computation time corresponding to the aperiodic CSI report in accordance with capability information associated with CSI computation transmitted by the UE. Of course, the CSI computation time corresponding to the aperiodic CSI report may also be determined in any other modes, which will not be particularly defined herein.

The preset CSI computation time list may be a list for determining the CSI computation time in accordance with a conventional protocol, e.g., TS38.214, as shown in the above Table 1.

It should be appreciated that, usually, the CSI report required for the network device may be a CSI reporting type capable of being supported by the UE.

It should be appreciated that, usually, the slot offset Y for the UE to transmit the aperiodic CSI report is a time interval between a slot within which the CSI report request information has been received from the UE and a slot within which the UE is required by the network device to transmit the aperiodic CSI report.

To be specific, the slot offset determination module 602 may include a time interval determination sub-module and a slot offset Y determination sub-module. The time interval determination sub-module is configured to determine a time offset X for the transmission of an aperiodic CSI-RS associated with the aperiodic CSI report, the time offset X being a time interval between a slot within which DCI for triggering the transmission of the aperiodic CSI report request information is located and a slot within which the aperiodic CSI-RS is transmitted. The slot offset Y determination sub-module configured to determine the slot offset Y for the UE to transmit the aperiodic CSI in accordance with the CSI computation time corresponding to the required CSI report and the required time offset X.

More specifically, the slot offset Y determination sub-module is further configured to: determine a ratio of the CSI computation time corresponding to the required CSI report to the number of OFDM symbols within one slot; round up the ratio to acquire an integer; and determine the slot offset Y for the UE to transmit the aperiodic CSI in accordance with the integer, the time offset X and a time advance N.

It should be appreciated that, when the CSI report request information received by the UE indicates the UE to transmit the CSI report to the network device after number Y of slots, the UE needs to calculate the CSI within a time period shorter than the slot offset Y, and when the UE fails to calculate the CSI, it is impossible for the UE to transmit the updated CSI to the network device.

Hence, in a possible embodiment of the present disclosure, the slot offset Y may be calculated through a formula $\geq X+[Z/N_{symb}^{slot}+N]$ (6), where X represents the time offset X, Z represents the CSI computation time in Step 301, $N_{symb}^{slot}$ represents the number of OFDM symbols within one slot, [ ] represents a round-up operation, and N represents a time advance TA and has a unit of OFDM symbol, e.g., TA=1.4 OFDM symbols.

The slot offset $n_{CQI\_ref}$ of the CSI reference resource mentioned hereinabove is also calculated in accordance with a ratio $Z/N_{symb}^{slot}$, so in a possible embodiment of the present disclosure, the slot offset Y may also be calculated through a formula $Y \geq X+T+N$ (7).

According to the network device 600 in the embodiments of the present disclosure, the slot offset Y for the UE to transmit the aperiodic CSI report may be determined in accordance with the CSI computation time corresponding to the required aperiodic CSI report for the UE, so the network device may determine the slot offset Y for the UE to transmit the aperiodic CSI report in a more appropriate manner. As a result, the UE may transmit the updated CSI to the network device successfully upon the receipt of the CSI report request information, and the CSI acquired by the network device may reflect an actual channel state in a better manner.

In a possible embodiment of the present disclosure, the network device 600 may further include a UE capability reception module configured to, when the CSI computation time corresponding to the aperiodic CSI report is determined by the network device in accordance with capability information associated with CSI computation transmitted by the UE, prior to the determination of the CSI computation time corresponding to the required aperiodic CSI report for the UE, receive the capability information associated with CSI computation transmitted by the UE.

The capability information associated with CSI computation may include one or more of CSI reporting types supported by the UE, a value of the maximum number of CSI reports supported by the UE, a CSI computation time for each CSI reporting type supported by the UE corresponding to at least one CSI computation complexity level at different numerologies, and identifier(s) of the list(s) of CSI computation time supported by the UE.

In a possible embodiment of the present disclosure, the capability information associated with CSI computation may further include one or more of: information indicating that the UE supports a capability of updating CSI belonging to a plurality of CCs simultaneously as well as a CSI computation time corresponding to each CSI computation complexity level at a corresponding numerology; and information indicating that the UE supports a capability of updating CSI report group information having different CSI reporting types or at different CSI computation complexity levels or different numerologies simultaneously as well as corresponding CSI computation time.

Based on the above, in a possible embodiment of the present disclosure, the network device 600 may further include a configuration module configured to configure the CSI computation time determined in accordance with the capability information associated with CSI computation transmitted by the UE for the UE.

It should be appreciated that, when the CSI computation time for each CSI report at the numerology and the CSI computation complexity level is determined in accordance with the capability information associated with CSI computation of the UE, the determined slot offset Y for the UE to transmit the CSI report may match the CSI computation capability of the UE itself in a better manner. As a result, it is able for the UE to transmit the CSI report to the network device at a more appropriate time, and prevent the occurrence of a waste of time-domain resources and the occurrence of a failure of transmitting an updated CSI report to the network device due to an insufficient computation time, thereby to improve the feedback efficiency of the CSI report for the UE.

The implementation of the network device 600 may refer to that of the method in FIG. 3, and units/modules of the network device 600 as well as the above-mentioned other operations and/or functions may be used to implement corresponding procedures in the method as shown in FIG. 3, which will not be particularly defined herein for conciseness.

Figure 7:
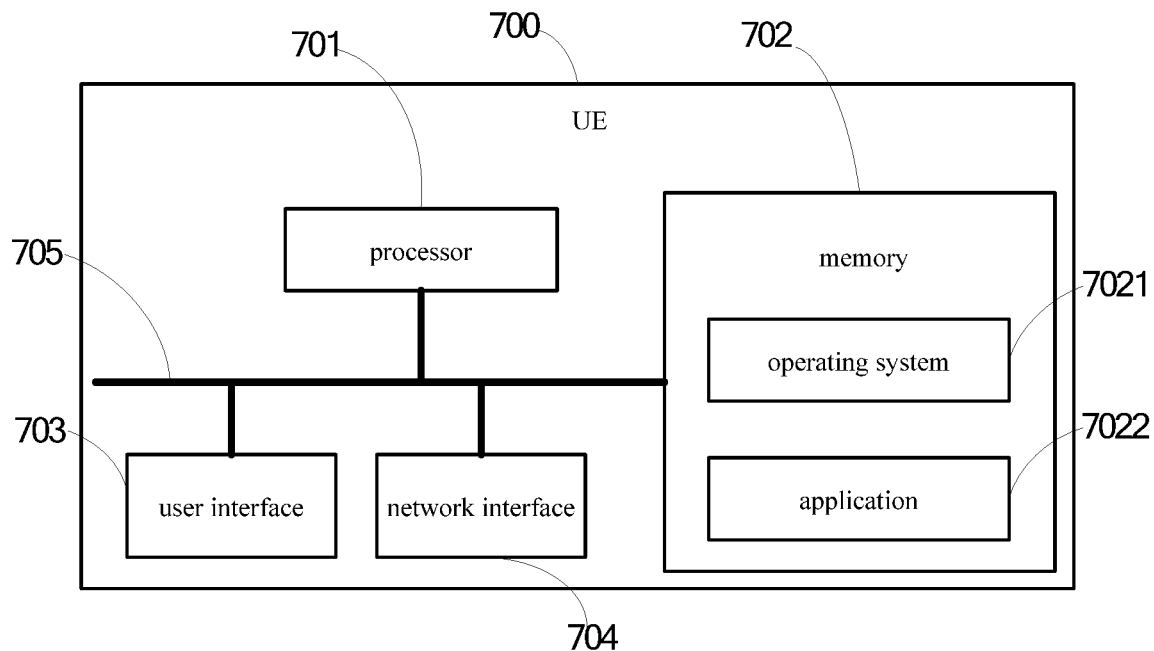
FIG. 7 is another schematic view showing the UE according to some embodiments of the present disclosure.

The present disclosure further provides in some embodiments a UE 700 which, as shown in FIG. 7, includes at least one processor 701, a memory 702, at least one network interface 704, and a user interface 703. The components of the UE 700 may be coupled together through a bus system 705. It should be appreciated that, the bus system 705 is configured to achieve connection and communication among the components. Apart from a data bus, the bus system 705 may further include a power source bus, a control bus and a state signal bus. For clarification, all these buses in FIG. 7 may be collectively called as bus system 705.

The user interface 703 may include a display, a keyboard or a pointing device (e.g., mouse, track ball, touch plate or touch panel).

It should be appreciated that, the memory 702 may be a volatile memory, a nonvolatile memory or both. The nonvolatile memory may be a Read-Only Memory (ROM), a Programmable ROM (PROM), an Erasable PROM (EPROM), an electrically EPROM (EEPROM) or a flash memory. The volatile memory may be a Random Access Memory (RAM) which serves as an external high-speed cache. Illustratively but non-restrictively, the RAM may include Static RAM (SRAM), Dynamic RAM (DRAM), Synchronous DRAM (SDRAM), Double Data Rate SDRAM (DDRSDRAM), Enhanced SDRAM (ESDRAM), Synchronous Link DRAM (SLDRAM) or Direct Rambus RAM (DRRAM). The memory 702 intends to include, but not limited to, the above-mentioned and any other appropriate memories.

In a possible embodiment of the present disclosure, the following elements may be stored in the memory 1702: an executable module or data structure, a subset or an extended set thereof, an operating system 7021 and an application 7022.

The operating system 7021 may include various system programs, e.g., a framework layer, a core layer and a driving layer, so as to implement various basic services and process hardware-based tasks. The application 7022 may include various applications, e.g., Media Player and Browser, so as to implement various application services. The programs for implementing the above-mentioned method may be included in the application 7022.

In the embodiments of the present disclosure, the UE 700 may further include a computer program stored in the memory 702 and executed by the processor 701. The processor 701 is configured to execute the computer program so as to implement the above-mentioned UE capability reporting method or slot offset determination method with a same technical effect, which will not be particularly defined herein.

The above-mentioned method may be applied to, or implemented by, the processor 701. The processor 701 may be an integrated circuit (IC) having a signal processing capability. During the implementation, the steps of the above-mentioned method may be completed through an integrated logic circuit of hardware in the processor 701 or instructions in the form of software. The processor 701 may be a general-purpose processor, a digital signal processor, an application-specific integrated circuit (ASIC), a field programmable gate array (FPGA) or any other programmable logic element, a discrete gate or transistor logic element, or a discrete hardware assembly, which may be used to implement or execute the methods, steps or logic diagrams in the embodiments of the present disclosure. The general purpose processor may be a microprocessor or any other conventional processor. The steps of the method in the embodiments of the present disclosure may be directly implemented by the processor in the form of hardware, or a combination of hardware and software modules in the processor. The software module may be located in a known storage medium such as an RAM, a flash memory, an ROM, a PROM, an EEPROM, or a register. The storage medium may be located in the memory 702, and the processor 701 may read information stored in the memory 702 so as to implement the steps of the method in conjunction with the hardware. To be specific, a computer program may be stored in the computer-readable storage medium, and the processor 701 may execute the computer program so as to implement the above-mentioned UE capability reporting method or slot offset determination method.

It should be appreciated that, the embodiments of the present disclosure may be implemented by hardware, software, firmware, middleware, microcode or a combination thereof. For the hardware implementation, the processor may include one or more of an ASIC, a DSP, a DSP device (DSPD), a Programmable Logic Device (PLD), an FPGA, a general-purpose processor, a controller, a microcontroller, a microprocessor, any other electronic unit capable of achieving the functions in the present disclosure, or a combination thereof.

For the software implementation, the scheme in the embodiments of the present disclosure may be implemented through modules capable of achieving the functions in the present disclosure (e.g., processes or functions). Software codes may be stored in the memory and executed by the processor. The memory may be implemented inside or outside the processor.

Figure 8:
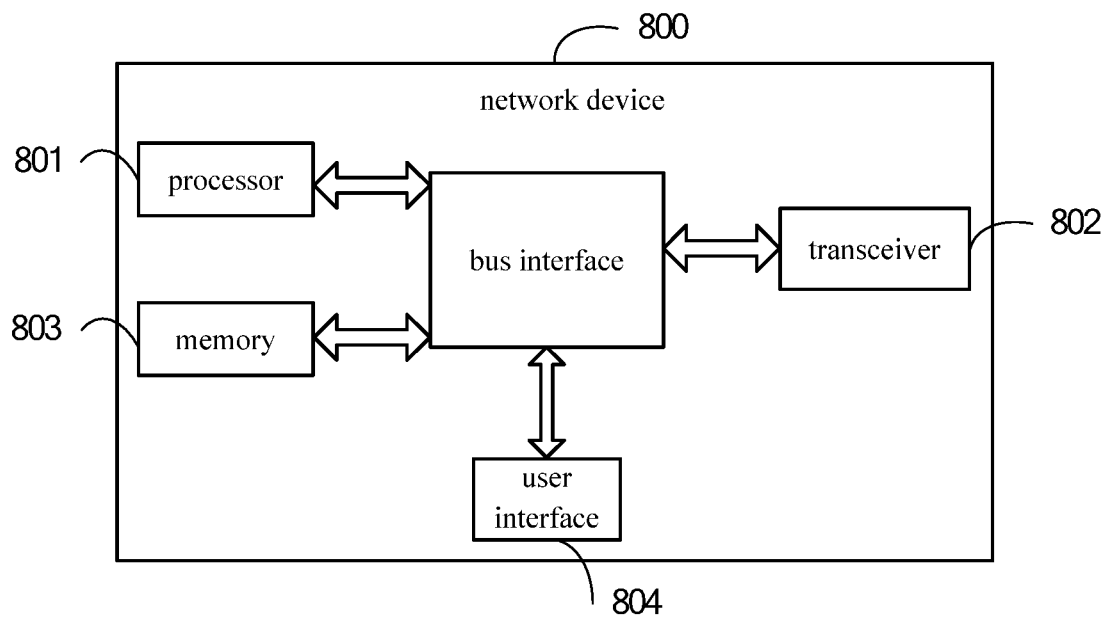
FIG. 8 is yet another schematic view showing the network device according to some embodiments of the present disclosure.

The present disclosure further provides in some embodiments a network device capable of implementing the above-mentioned slot offset Y determination method with a same technical effect. As shown in FIG. 8, the network device 800 includes a processor 801, a transceiver 802, a memory 803, a user interface 804 and a bus interface.

In the embodiments of the present disclosure, the network device 800 may further include a computer program stored in the memory 803 and executed by the processor 801. The processor 801 is configured to execute the computer program so as to implement the above-mentioned slot offset determination method with a same technical effect, which will not be particularly defined herein.

In FIG. 8, bus architecture may include a number of buses and bridges connected to each other, so as to connect various circuits for one or more processors 801 and one or more memories 803. In addition, as is known in the art, the bus architecture may be used to connect any other circuits, such as a circuit for a peripheral device, a circuit for a voltage stabilizer and a power management circuit. The bus interface may be provided, and the transceiver 802 may consist of a plurality of elements, i.e., a transmitter and a receiver for communication with any other devices over a transmission medium. With respect to different UEs, the user interface 804 may also be provided for devices which are to be arranged inside or outside the UE, and these devices may include but not limited to a keypad, a display, a speaker, a microphone and a joystick. The processor 801 may take charge of managing the bus architecture as well as general processings. The memory 803 may store therein data for the operation of the processor 801.

The present disclosure further provides in some embodiments a computer-readable storage medium storing therein a computer program. The computer program is executed by a processor so as to implement the above-mentioned UE capability reporting method or slot offset determination method with a same technical effect, which will not be particularly defined herein. The computer-readable storage medium may be an ROM, an RAM, a magnetic disk or an optical disk.

The present disclosure further provides in some embodiments a computer program product including an instruction. The instruction in the computer program product is executed by a computer, so as to implement the above-mentioned UE capability reporting method or slot offset determination method. To be specific, the computer program product may run on the UE.

It should be appreciated that, units and steps described in the embodiments of the present disclosure may be implemented in the form of electronic hardware, or a combination of a computer program and the electronic hardware. Whether or not these functions are executed by hardware or software depends on specific applications or design constraints of the technical solution. Different methods may be adopted with respect to the specific applications so as to achieve the described functions, without departing from the scope of the present disclosure.

It should be further appreciated that, for convenience and clarification, operation procedures of the system, device and units described hereinabove may refer to the corresponding procedures in the method embodiment, and thus will not be particularly defined herein.

It should be further appreciated that, the device and method may be implemented in any other ways. For example, the embodiments for the apparatus is merely for illustrative purposes, and the modules or units are provided merely on the basis of their logic functions. During the actual application, some modules or units may be combined together or integrated into another system. Alternatively, some functions of the module or units may be omitted or not executed. In addition, the coupling connection, direct coupling connection or communication connection between the modules or units may be implemented via interfaces, and the indirect coupling connection or communication connection between the modules or units may be implemented in an electrical or mechanical form or in any other form.

The units may be, or may not be, physically separated from each other. The units for displaying may be, or may not be, physical units, i.e., they may be arranged at an identical position, or distributed on a plurality of network elements. Parts or all of the units may be selected in accordance with the practical need, so as to achieve the purpose of the present disclosure.

In addition, the functional units in the embodiments of the present disclosure may be integrated into a processing unit, or the functional units may exist independently, or two or more functional units may be combined together.

In the case that the functional units are implemented in a software form and sold or used as a separate product, they may be stored in a computer-readable medium. Based on this, the technical solutions of the present disclosure, partial or full, or parts of the technical solutions of the present disclosure contributing to the related art, may appear in the form of software products, which may be stored in a storage medium and include several instructions so as to enable computer equipment (a personal computer, a server or network equipment) to execute all or parts of the steps of the method according to the embodiments of the present disclosure. The storage medium includes any medium capable of storing therein program codes, e.g., a universal serial bus (USB) flash disk, a mobile hard disk (HD), an ROM, an RAM, a magnetic disk or an optical disk.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A slot offset determination method performed by a User Equipment (UE), comprising:
  receiving Channel State Information (CSI) report request information from a network device;
  determining a reference slot offset T in accordance with the CSI report request information; and
  determining a slot offset for a CSI reference resource in accordance with the reference slot offset T,
  wherein the slot offset for the CSI reference resource refers to a time difference between a slot for CSI transmitted by the UE to the network device and a slot where the CSI reference source is located,
  wherein the determining the reference slot offset T in accordance with the CSI report request information comprises:
    determining a CSI computation time for the CSI report in accordance with the CSI report request information; and
    determining the reference slot offset T in accordance with the CSI computation time, wherein the determining the reference slot offset T in accordance with the CSI computation time comprises:
determining the reference slot offset T for CSI reference resource, according to a ratio of the CSI computation time to the number of OFDM symbols within one slot.

2. The slot offset determination method according to claim 1, wherein the determining the CSI computation time for the CSI report in accordance with the CSI report request information comprises:
determining a numerology and a CSI computation complexity level corresponding to the CSI report in accordance with the CSI report request information; and
determining the CSI computation time for the CSI report at the numerology and the CSI computation complexity level,
wherein the determining the CSI computation time for the CSI report at the numerology and the CSI computation complexity level comprises any one of: determining the CSI computation time for the CSI report at the numerology and the CSI computation complexity level in accordance with capability information associated with CSI computation of the UE; receiving the CSI computation time for the CSI report at the numerology and the CSI computation complexity level configured by the network device in advance through signaling; and determining the CSI computation time for the CSI report at the numerology and the CSI computation complexity level in accordance with a preset CSI computation time list.

3. The slot offset determination method according to claim 1, wherein the determining the reference slot offset T for CSI reference resource, according to a ratio of the CSI computation time to the number of OFDM symbols within one slot comprises:
calculating a ratio of the CSI computation time to the number of OFDM symbols within one slot;
rounding up the ratio to acquire an integer; and
determining the integer as the reference slot offset T.

4. The slot offset determination method according to claim 1, wherein the determining the reference slot offset T in accordance with the CSI computation time comprises:
when the CSI report determined in accordance with the CSI report request information is a periodic or semi-persistent CSI report, determining a first reference slot offset T1 in accordance with the CSI computation time.

5. The slot offset determination method according to claim 1, wherein the determining the reference slot offset T in accordance with the CSI computation time comprises:
when the CSI report determined in accordance with the CSI report request information is an aperiodic CSI report and the slot within which the CSI report is indicated by the network device in Downlink Control Information (DCI) is different from the slot within which the DCI comprising the CSI report request information is located, determining a second reference slot offset T2 in accordance with the CSI computation time.

6. The slot offset determination method according to claim 1, wherein when the CSI report request information indicates that there is a plurality of CSI reports and there is a plurality of reference slot offsets T determined in accordance with the CSI computation time for the plurality of CSI reports, the determining the slot offset for the CSI reference resource in accordance with the reference slot offset T comprises:
determining the slot offset for the CSI reference resource in accordance with a maximum value of the plurality of determined reference slot offsets T; or
determining slot offsets of at least two CSI reference resources in accordance with different reference slot offsets T in the plurality of determined reference slot offsets T.

7. The slot offset determination method according to claim 1, further comprising:
transmitting the capability information associated with CSI computation to the network device, wherein the capability information associated with CSI computation comprises one or more of CSI reporting types supported by the UE, a value of the maximum number of CSI reports supported by the UE, the CSI computation time of each CSI reporting type supported by the UE corresponding to at least one CSI computation complexity level at different numerologies, and identifier(s) of the list(s) of CSI computation time supported by the UE.

8. The slot offset determination method according to claim 7, wherein the capability information associated with CSI computation further comprises one or more of:
information indicating that the UE supports a capability of updating CSI belonging to a plurality of Component Carriers (CCs) simultaneously as well as a CSI computation time corresponding to each CSI computation complexity level at a corresponding numerology; and
information indicating that the UE supports a capability of updating CSI report group information having different CSI reporting types or at different CSI computation complexity levels or different numerologies simultaneously as well as corresponding CSI computation time.

9. A slot offset determination method performed by a network device, comprising:
determining a Channel State Information (CSI) computation time for a User Equipment (UE) to generate a target CSI report;
determining a reference slot offset T in accordance with the CSI computation time; and
transmitting the reference slot offset T to the UE,
wherein the determining the reference slot offset T in accordance with the CSI computation time comprises:
determining the reference slot offset T for CSI reference resource, according to a ratio of the CSI computation time to the number of Orthogonal Frequency Division Multiplexing (OFDM) symbols within one slot.

10. The slot offset determination method according to claim 9, wherein the generating the CSI computation time for the UE to generate the target CSI report comprises:
receiving the CSI computation time for the UE to generate the target CSI report from the UE, or
wherein the generating the CSI computation time for the UE to generate the target CSI report comprises:
receiving an identifier of a CSI computation time list supported by the UE from the UE;
determining a target CSI computation time list matching the identifier from a set of preset CSI computation time lists in accordance with the identifier; and
looking up the CSI computation time matching the target CSI report in the target CSI computation time list.

11. The slot offset determination method according to claim 9, wherein the determining the reference slot offset T for CSI reference resource, according to a ratio of the CSI computation time to the number of OFDM symbols within one slot comprises:

calculating a ratio of the CSI computation time to the number of OFDM symbols within one slot;
rounding up the ratio to acquire an integer; and
determining the integer as the reference slot offset T.

12. A User Equipment (UE), comprising a memory, a processor, and a wireless communication program stored in the memory and executed by the processor, wherein the processor is configured to execute the wireless communication program so as to implement a slot offset determination method performed by the UE, comprising:
receiving Channel State Information (CSI) report request information from a network device;
determining a reference slot offset T in accordance with the CSI report request information; and
determining a slot offset for a CSI reference resource in accordance with the reference slot offset T,
wherein the slot offset for the CSI reference resource refers to a time difference between a slot for CSI transmitted by the UE to the network device and a slot where the CSI reference source is located,
wherein the determining the reference slot offset T in accordance with the CSI report request information comprises:
determining a CSI computation time for the CSI report in accordance with the CSI report request information; and
determining the reference slot offset T in accordance with the CSI computation time,
wherein the determining the reference slot offset T in accordance with the CSI computation time comprises:
determining the reference slot offset T for CSI reference resource, according to a ratio of the CSI computation time to the number of OFDM symbols within one slot.

13. A network device, comprising a memory, a processor, and a wireless communication program stored in the memory and executed by the processor, wherein the processor is configured to execute the wireless communication program so as to implement the slot offset determination method according to claim 9.

14. The UE according to claim 12, wherein the processor is configured to execute the wireless communication program so as to implement a slot offset determination method for the UE, comprises:
when the CSI report determined in accordance with the CSI report request information is an aperiodic CSI report and the slot within which the CSI report is indicated by the network device in Downlink Control Information (DCI) is different from the slot within which the DCI comprising the CSI report request information is located, determining a second reference slot offset T2 in accordance with the CSI computation time.

15. The UE according to claim 12, wherein the processor is configured to execute the wireless communication program so as to implement a slot offset determination method for the UE, comprises:
determining a numerology and a CSI computation complexity level corresponding to the CSI report in accordance with the CSI report request information; and
determining the CSI computation time for the CSI report at the numerology and the CSI computation complexity level,
wherein the determining the CSI computation time for the CSI report at the numerology and the CSI computation complexity level comprises any one of: determining the CSI computation time for the CSI report at the numerology and the CSI computation complexity level in accordance with capability information associated with CSI computation of the UE; receiving the CSI computation time for the CSI report at the numerology and the CSI computation complexity level configured by the network device in advance through signaling; and determining the CSI computation time for the CSI report at the numerology and the CSI computation complexity level in accordance with a preset CSI computation time list.

16. The UE according to claim 12, wherein the determining the reference slot offset T for CSI reference resource, according to a ratio of the CSI computation time to the number of OFDM symbols within one slot comprises:
calculating a ratio of the CSI computation time to the number of OFDM symbols within one slot;
rounding up the ratio to acquire an integer; and
determining the integer as the reference slot offset T.

17. The UE according to claim 12, wherein the determining the reference slot offset T in accordance with the CSI computation time comprises:
when the CSI report determined in accordance with the CSI report request information is a periodic or semi-persistent CSI report, determining a first reference slot offset T1 in accordance with the CSI computation time.

18. The UE according to claim 12, wherein when the CSI report request information indicates that there is a plurality of CSI reports and there is a plurality of reference slot offsets T determined in accordance with the CSI computation time for the plurality of CSI reports, the determining the slot offset for the CSI reference resource in accordance with the reference slot offset T comprises:
determining the slot offset for the CSI reference resource in accordance with a maximum value of the plurality of determined reference slot offsets T; or
determining slot offsets of at least two CSI reference resources in accordance with different reference slot offsets T in the plurality of determined reference slot offsets T.

19. The UE according to claim 12, wherein the slot offset determination method further comprises:
transmitting the capability information associated with CSI computation to the network device, wherein the capability information associated with CSI computation comprises one or more of CSI reporting types supported by the UE, a value of the maximum number of CSI reports supported by the UE, the CSI computation time of each CSI reporting type supported by the UE corresponding to at least one CSI computation complexity level at different numerologies, and identifier(s) of the list(s) of CSI computation time supported by the UE.

20. The UE according to claim 19, wherein the capability information associated with CSI computation further comprises one or more of:
information indicating that the UE supports a capability of updating CSI belonging to a plurality of Component Carriers (CCs) simultaneously as well as a CSI computation time corresponding to each CSI computation complexity level at a corresponding numerology; and
information indicating that the UE supports a capability of updating CSI report group information having different CSI reporting types or at different CSI computation complexity levels or different numerologies simultaneously as well as corresponding CSI computation time.

* * * * *